United States Patent [19]

George

[11] 4,319,601
[45] * Mar. 16, 1982

[54] TRIGGER MECHANISM FOR SIPHON APPARATUS

[76] Inventor: John A. George, R.R. 1, Uniontown, Kans. 66779

[*] Notice: The portion of the term of this patent subsequent to Feb. 10, 1998, has been disclaimed.

[21] Appl. No.: 43,962

[22] Filed: May 30, 1979

Related U.S. Application Data

[63] Continuation-in-part of Ser. No. 821,404, Aug. 3, 1977, Pat. No. 4,181,142.

[51] Int. Cl.³ .............................................. F04F 10/02
[52] U.S. Cl. ..................................... 137/124; 137/139
[58] Field of Search ................................. 137/124, 139

[56] References Cited

U.S. PATENT DOCUMENTS

| | | | |
|---|---|---|---|
| 449,267 | 3/1891 | Maraun | 137/139 |
| 909,340 | 1/1919 | Shields et al. | 137/138 X |
| 1,289,829 | 12/1919 | Leanhart | 137/139 |
| 3,797,513 | 3/1974 | Hazen | |
| 3,848,568 | 11/1974 | Hazen | |
| 3,874,402 | 4/1975 | Hazen | |
| 3,881,506 | 5/1975 | Hazen | |
| 4,249,559 | 2/1981 | George | 137/124 |

FOREIGN PATENT DOCUMENTS

| | | | |
|---|---|---|---|
| 497237 | 11/1919 | France | 137/139 |
| 671 | 5/1885 | Sweden | 137/139 |
| 1122 | of 1908 | United Kingdom | 137/139 |

Primary Examiner—Gerald A. Michalsky
Attorney, Agent, or Firm—Fishburn, Gold and Litman

[57] ABSTRACT

In a siphon apparatus having at least two legs with a liquid trap therebetween, a liquid holding chamber is provided which communicates with the liquid trap through a restrictive orifice and which fills the liquid trap after the siphon is used, thereby insuring a liquid seal for the next use of the siphon. An overflow device is provided for the liquid trap which cooperates with a trigger mechanism to fill the liquid trap to a predetermined level at the same time assuring the filling of the trigger mechanism. The trigger device may be connected to a plurality of siphons, whereby each siphon flushes simultaneously when a predetermined level is reached in a tank which is to be discharged thereby. Preferably the siphons are conchoidally or spirally shaped, and the holding chamber comprises an inner void thereof. Also the siphon is designed to concentrate head losses near the discharge thereof by bell-shaping the inlet, progressively reducing the cross-sectional area of the legs of the siphon toward the outlet, and by reducing the radius of elbows toward the outlet.

6 Claims, 6 Drawing Figures

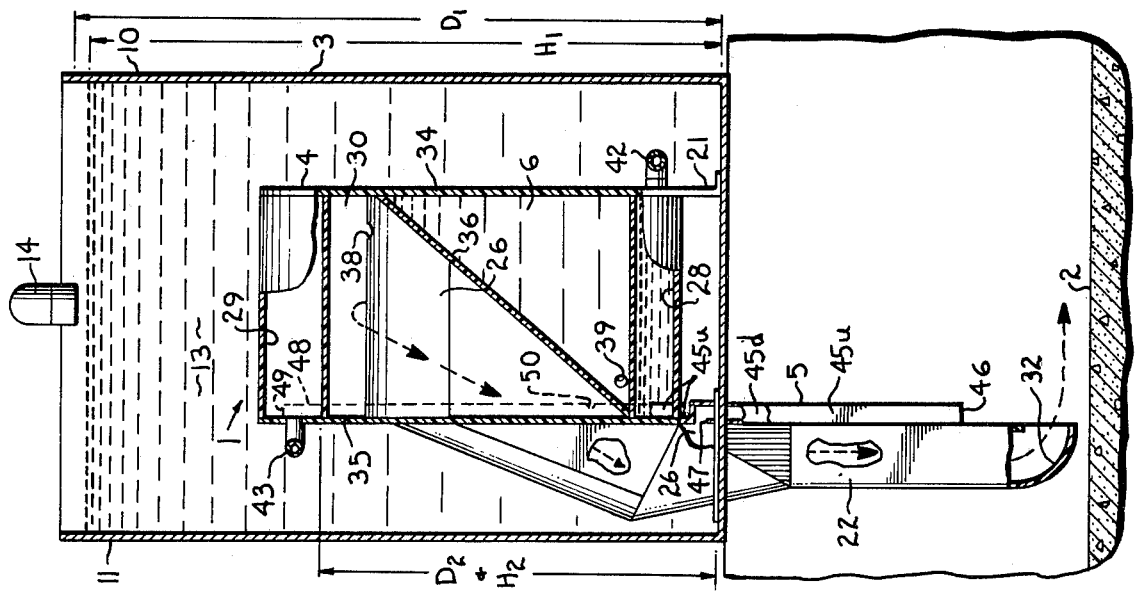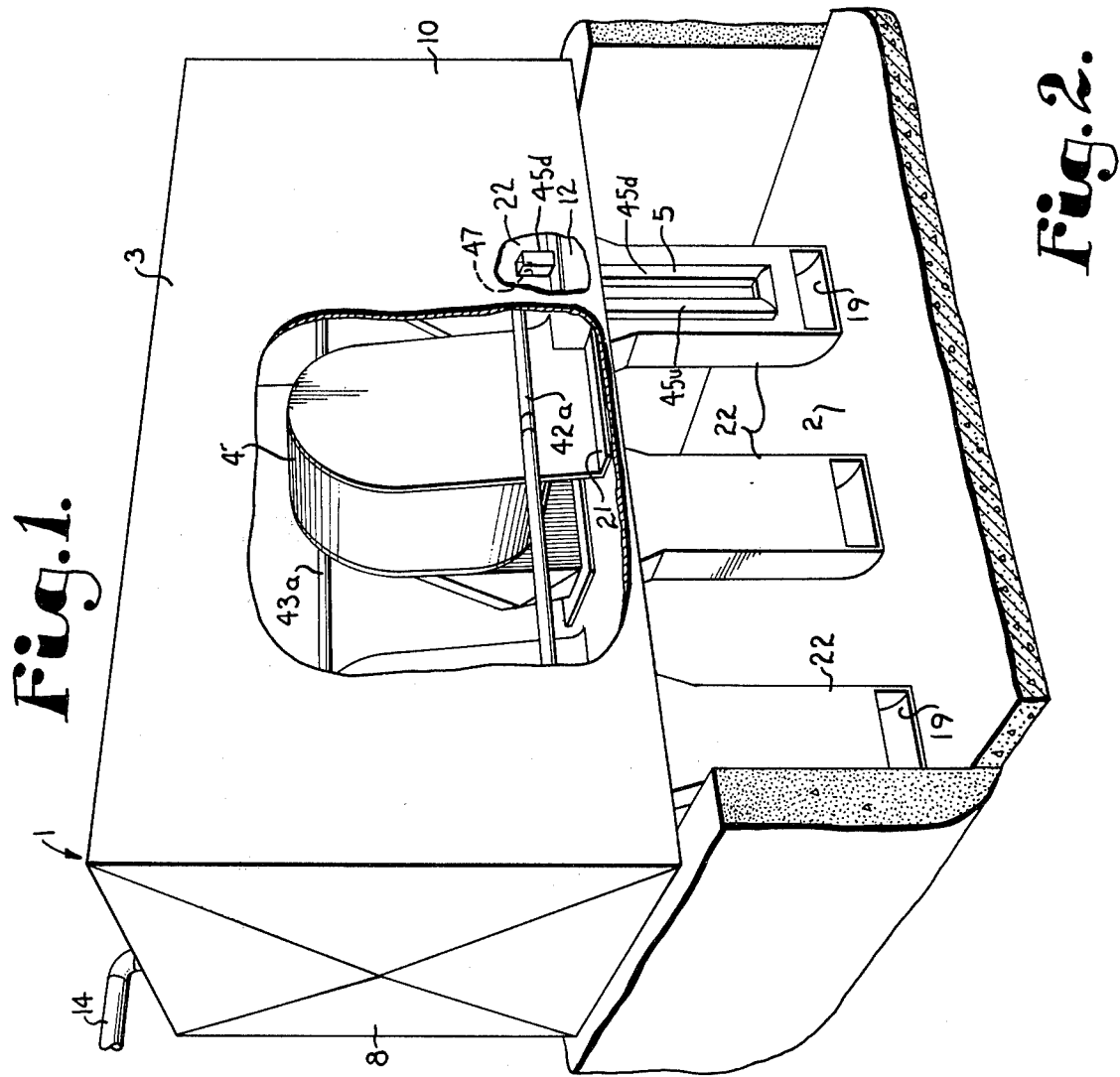

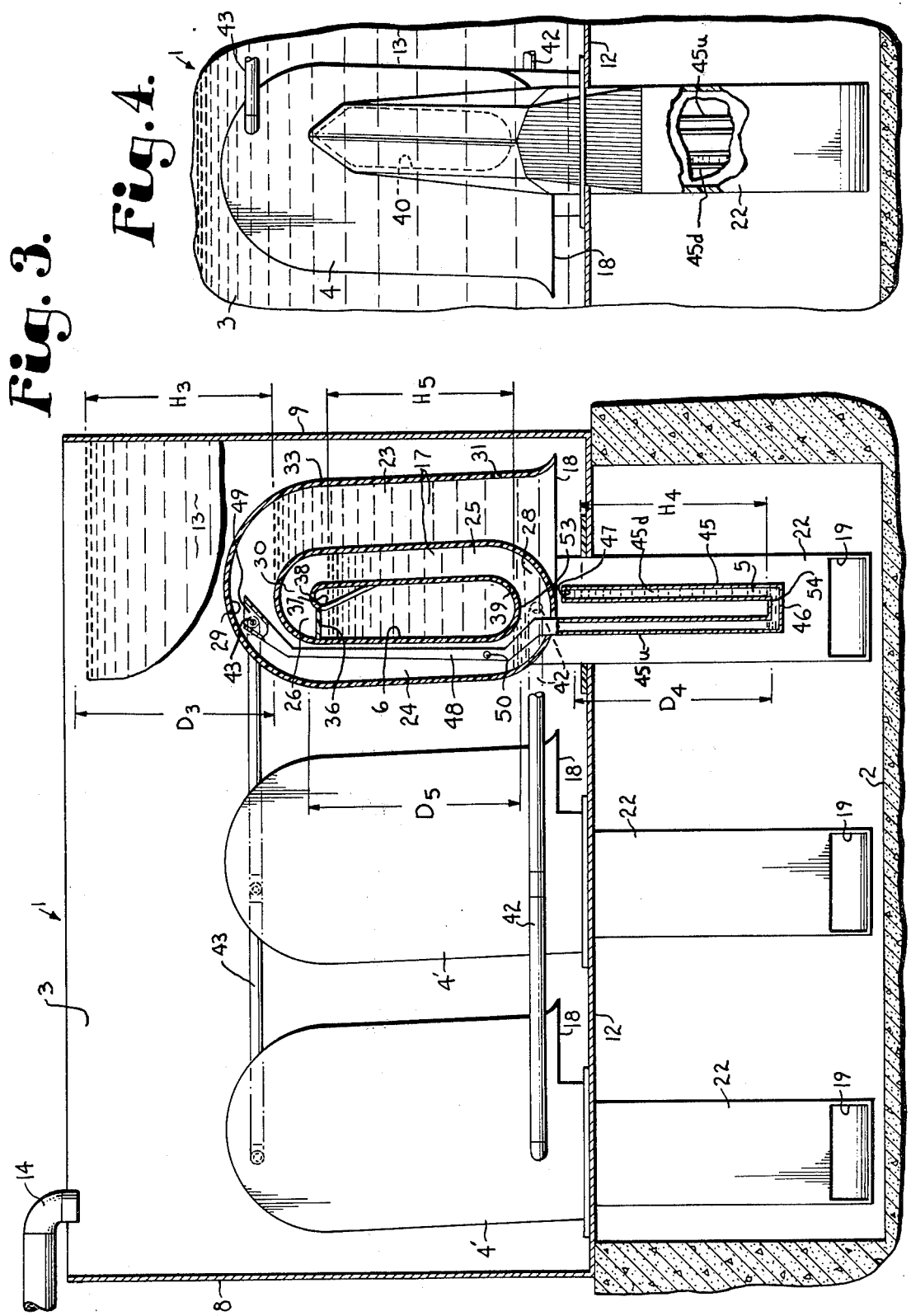

TRIGGER MECHANISM FOR SIPHON APPARATUS

CROSS-REFERENCE TO RELATED APPLICATIONS

The present application is a continuation-in-part of United States application Ser. No. 821,404, filed Aug. 3, 1977, entitled SIPHON APPARATUS, now U.S. Pat. No. 4,181,142.

BACKGROUND OF THE INVENTION

The present invention relates to siphons adapted for discharging liquid from a tank at the end of a periodic cycle and, in particular, to a consistent siphon which begins each cycle under substantially equivalent conditions with regard to liquid levels within the siphon. In addition, a trigger mechanism is provided to initiate discharge of the liquid when the level thereof reaches an adjustable but predetermined height. Consistency of operation under varying tank liquid levels and, in particular, varying driving heads is also ensured by concentrating liquid head losses in the siphon toward the outlet thereof. A particularly efficient and compact siphon is embodied in a spiral or conchoidal shape and multiple siphons can be interconnected by the trigger mechanism to initiate siphon action, that is vigorous liquid discharge, simultaneously.

Siphons, according to the present invention, are used to develop a relatively large directional flow of liquid over a relatively short period of time in order to flush debris from troughs and floors of livestock enclosures. Since moving parts tend to fail in such devices, the siphons are designed without such parts, depending for operation on the forces of gravity, liquid hydraulic pressures and strategic placement of parts, such that sudden discharge of liquid from the siphon is triggered at the appropriate time, without allowing the siphon to become "waterlogged," that is discharge liquid slowly and continuously. Such siphons should be able to function under varying heads and varying liquid output requirements, so that a single design can be used for alternative services, rather than producing different designs for each service; this is especially true for driving heads. In conventional siphons a particular design often functions properly under only one general head condition. The siphon should be efficient and concentrate head losses therein toward the outlet thereof, thus being able to operate with an extremely low driving head.

Many conventional siphons require elaborate siphon break mechanisms to ensure sufficient liquid remains therein to fill liquid traps for succeeding discharge cycles. Such devices are inconsistent in operation and are often easily plugged by debris, causing over or under filling of liquid traps and consequently causing flooding or waterlogging of the siphon, which requires manual attention to correct. In addition many conventional devices are bulky in design and shape.

OBJECTS OF THE INVENTION

Therefore the principal objects of the present invention are: to provide a siphon for discharging a liquid holding tank after the liquid in the tank reaches a predetermined height without the need for moving mechanical parts; to provide a simple mechanism for refilling a liquid trap in such a siphon whereby the siphon is prepared for successive discharges of liquid; to provide such a siphon which has a unique spiral configuration wherein the siphon is compact and a central void thereof serves as a holding chamber for filling the liquid trap being connected therewith by a restrictive orifice which prevents the siphon from discharging the liquid in the chamber when the tank empties; to provide an overflow device for the liquid trap which assures consistent filling thereof and proper operation of the siphon; to provide a trigger mechanism for such a siphon which cooperates with the overflow device and allows joining of a plurality of such siphons such that they discharge simultaneously; to provide such a siphon which concentrates head losses near the discharge thereof; to provide such a siphon which is not susceptible to failure due to blockage by debris in the liquid; and to provide such a siphon which is capable of an extended useful life, and is particularly well adapted for the proposed use.

Othe objects and advantages of this invention will become apparent from the following description taken in connection with the accompanying drawings wherein are set forth, by way of illustration and example, certain embodiments of this invention.

SUMMARY OF THE INVENTION

A liquid holding chamber or void is provided for a siphon for discharging liquid from a tank requiring a liquid trap therein for proper establishment of vigorous siphon action therefrom. The liquid holding chamber communicates with the liquid trap through a restrictive orifice which prevents the chamber from being drawn empty by the siphon, but which allows the siphon trap to refill in sufficient time for use in proper priming of the siphon. This overcomes the conventional problem of the liquid trap being emptied at the end of the liquid discharge, unless siphon breaks are provided to stop the discharge before the tank is emptied to the level of the siphon inlet. In addition an overflow conduit or weep hole is preferably positioned so as to remove excess liquid from the liquid trap, thus assuring substantially equivalent filling of the liquid trap in conjunction with each filling of the tank. Also the overflow conduit cooperates with a trigger mechanism. The prefered siphon comprises a conchoidally or spirally shaped series of legs including in order of flow therethrough an outer first or inlet leg, second and third middle legs with the liquid trap inbetween, and an outlet leg a first part of which is interiorally positioned in the siphon but which discharges outside and below the tank. Head losses in the siphon are concentrated toward the outlet thereof by progressively reducing from the inlet to the outlet the cross-sectional area thereof, reducing from the inlet to the outlet the radius and cross-sectional area of bends and placing additional flow restrictions toward the outlet of the siphon. During filling of the tank an air pocket is entrapped in an air trap between a liquid column rising in the siphon inlet leg and the liquid trap. As this air pocket is pressurized by the rising liquid column in the inlet leg, the air may initially partially bypass the liquid trap; however, eventually liquid columns develop in the second and third leg, such that the liquid trap prevents air from bypassing same and this produces further pressurization of the air in the air pocket. The trigger mechanism also has a liquid trap which has liquid therein communicating with the pressurized air in the air trap which produces differential levels in the liquid on each side of the trigger mechanism liquid trap.

There is a maximum height which this differential level can reach in the trigger mechanism liquid trap, at which time air from the pressurized air pocket will blow through this trap. This occurs before liquid overflows the third leg of the siphon. The release of air through the trigger mechanism releases the air pressure in the air pocket upsetting the balance of the siphon and allowing the liquid in the inlet leg to surge toward the siphon outlet, thus initiating a strong siphon action. As used herein siphon action includes two separate modes, in particular a drain mode, until the tank liquid level is lowered to the height of the siphon and a siphon mode as the tank continues to empty to the inlet level of the siphon inlet. During siphon action, the liquid in the tank flows vigorously through the siphon and is discharged in a relatively high velocity stream onto a surface to be cleaned. The trigger mechanism can be used to simultaneously initiate siphon action in a plurality of siphons having air and water traps interconnected whenever the liquid level in the tank reaches a predetermined level.

The drawings constitute a part of this specification and include exemplary embodiments of the present invention and illustrate various objects and features thereof.

BRIEF DESCRIPTION OF THE DRAWINGS

FIG. 1 is a perspective view of a liquid holding tank and a plurality of siphons according to the present invention for discharging liquid therefrom, a portion of the tank being broken away to show one of the siphons.

FIG. 2 is a side elevational view of the tank shown in FIG. 1 with sections broken away to show structural details and, in particular, one of the siphons.

FIG. 3 is a front elevational view of the tank shown in FIG. 1 with sections broken away to show structural details thereof and of the siphons.

FIG. 4 is a fragmentary rear elevational view of a portion of the tank of FIG. 1 showing structural detail of one of the siphons.

DETAILED DESCRIPTION OF THE PREFERRED EMBODIMENT

Figure 6:
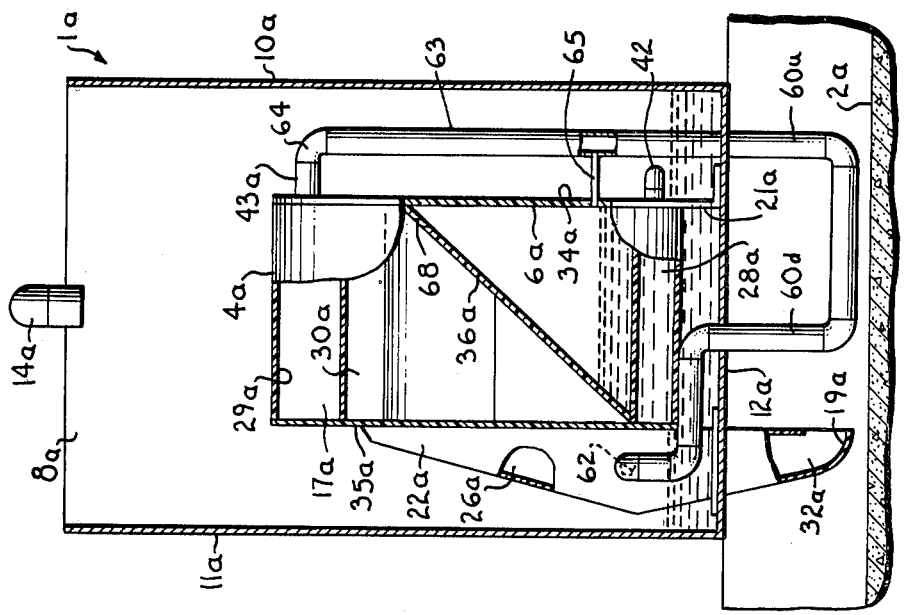
FIG. 6 is a side view of the tank and siphon shown in FIG. 5.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the embodiment shown in FIGS. 1, 2, 3 and 4, the reference numeral 1 designates a liquid flushing device or siphon apparatus for cleaning refuse from floors or troughs 2 used by livestock or other enclosed animals. The siphon apparatus 1 includes a tank or other equivalent liquid reservoir 3 and a plurality of liquid siphons 4. The siphons 4 are interconnected and flush simultaneously, the flushing being initiated by a trigger mechanism 5 which will be discussed below in greater detail.

By flushing is meant a sudden and vigorous discharge of liquid rather than a slow or trickling discharge. Each of the siphons 4 includes a liquid holding chamber or void 6 which will be discussed in greater detail below.

As used herein the terms "front," "rear," "back," "top," "bottom," "side" and derivatives thereof are understood to have the same point of reference as used for the description of the drawings above.

The tank 3 has sides 8 and 9, a front 10, a rear 11, and a bottom 12, thus forming a holding enclosure for a liquid 13, such as water. A liquid source such as fill conduit 14 fills the tank 3. The tank 3 is suitably mounted above the trough surface 2 to be cleaned.

Each siphon 4 of the present embodiment includes a fluid flow pathway 17 therethrough which has an inlet 18 opening into the tank 3 and an outlet 19 which discharges liquid exiting therefrom onto the trough surface 2. As used herein, the term "upstream" when used comparatively means relatively closer to to inlet 18 and the term "downstream" means relatively closer to the outlet 19 along the flow pathway 17. Although the siphons 4 are shown positioned within the tank 3, it is only necessary that the inlet 18 be located within the confines of the tank 3. The height of the inlet 18 above the tank bottom 12 determines the minimum amount of liquid 13 which will be left in the tank 3 after same is emptied by the siphon 4. It is important that the inlet 18 not be placed directly abutting the tank bottom 12, since the liquid 13 must have free access to the inlet 18. Each siphon 4 is supported in the front by a stand 21 resting on tank bottom 12 and in the rear by a siphon discharge chute 22 which penetrates the tank bottom 12 and is secured thereto.

Each siphon 4 is preferably conchoidal or spiral in shape. Such a shape provides a compact and highly efficient mechanism with a minimum of materials. Each siphon 4 of the present embodiment is comprised of four legs, tubes or conduits which are joined together by flow conveying elbows to provide the fluid flow pathway 17. The legs are positioned in a generally vertical attitude. In particular, the legs are, in consecutive order, an inlet leg 23, an upstream middle leg 24, a downstream middle leg 25, and an outlet leg 26 which is partially included in the discharge chute 22. The various legs 23, 24, 25 and 26 are connected by bends to form the fluid flow pathway 17. In particular, the upstream and downstream middle legs 24 and 25 are interconnected by a bend forming a liquid trap 28; the inlet leg 23 and upstream middle leg 24 are interconnected by a bend forming an air trap 29; and the downstream middle leg 25 and outlet leg 26 are interconnected by a bend 30. Thus with respect to the liquid trap 28 only the leg 24 is a first upstream leg, the leg 25 is a first downstream leg, the leg 23 is a second upstream leg and the leg 26 is a second downstream leg. The cross-sectional area of each of the legs 23, 24, 25 and 26 is progressively reduced preceding downstream. Total reduction in cross-sectional area between the inlet leg 23 and outlet leg 26 is in the nature of between 15 and 40%. The bends 28, 29 and 30 are also progressively narrowed in the downstream direction and the radii thereof are also shortened. The inlet leg 23 is flared or belled outwardly on the sides near the inlet 18. Optionally the inlet leg 23 includes an aperture or weep hole 31 which is positioned slightly above the inlet 18. The weep hole 31 has a sufficiently small cross-sectional area to prevent the siphon action from being disrupted by air being drawn therethrough, but has a large enough cross-sectional area to prevent plugging by debris or slime in the liquid. Use of the weep hole 31 is preferred in siphons 4 wherein the inlet 18 is submerged under liquid at the end of the discharge cycle. The outlet leg 26 includes a head loss means 32 near or at the outlet 19. The head loss means 32 may be an elbow or bend as illustrated or other suitable mechanism such as substantially restricting the cross-sectional area thereof. Preferably the head loss within the flow pathway 17 is only large enough to ensure that the liquid stream discharging from the siphon 4 not form a vena contracta of lesser cross-sectional area than that of the outlet leg 26, thus not allowing air to enter the outlet leg 26 through the outlet 19 which could disrupt the siphon action.

In the present embodiment the flow pathway 17 is substantially rectangular in cross-section. The flow pathway 17 spirals inwardly from the inlet 18 forming a conchoidal or sea shell shape. A curve passing through the center of each of the parts of the flow pathway 17 lies substantially in a single plane except for the portion of the outlet leg 26 which is included in the discharge chute 22. The outlet leg 26 is positioned between the legs 24 and 25, however, only the upper portion of the outlet leg 26 which is not included in the discharge chute is directly inbetween the legs 24 and 25. In addition, this upper portion of the outlet leg 26 occupies only the upper rear half of the space between the legs 23 and 24, the lower front half of this space being occupied by the chamber 6. The leg 26 and the chamber 6 are separated by a slanted plate 36. The separation plate 36 extends from the rear of the siphon 4 near the bottom of the chamber 6, as illustrated in FIG. 2, to the front of the siphon 4 near the top of the chamber 6. The outlet leg 26 exits the rear of the spiral formed by the legs 23, 24 and 25, enters the discharge chute 22 and extends below the remainder of the flow pathway 17, terminating in the outlet 19. Because of the spiral arrangement of the flow pathway 17, the various parts thereof, that is bends and legs, have a substantial number of common side walls thereby reducing construction material required.

The siphon 4 is formed by coiling a relatively elongate rectangular piece of sheet metal, fiberglas or other suitable material into a spiral shape of the desired dimensions and in this manner forms common wall member 33. Wall member 33 serves as both of the side walls for each of the legs 23, 24 and 25, each of the bends 28, 29 and 30, part of the leg 26 and the chamber 6. Flat sheets are attached to the opposite edges of the wall member 33 and form the front 34 and rear 35 of the siphon 4. The coiled wall member 33 has a loop 37 between the top of the outlet leg 26 on one side and the top of the downstream middle leg 25 on the other side. The front of the loop 37 intersects the separation plate 36 and thus, the left side of the loop 37, as viewed in FIG. 3, does not extend entirely across the width of the siphon 4. (This is shown in FIG. 2) The slanted plate 36 extends upward only until it intersects with the loop 37, therefore, the interior of the loop 37 near the front end thereof opens into chamber 6.

A vent or aperture 38 is positioned at the top of loop 37. The vent 38 allows communication between the chamber 6 and the bend 30. When the bend 30 has air under atmospheric pressure therein, that is when no liquid is flowing through the siphon 4, the vent 38 functions as a vacuum and pressure release device for the chamber 6, thus maintaining the contents of the chamber 6 substantially at atmospheric pressure. When the flow pathway 17 is full of liquid, such liquid may enter the chamber 6 through the vent 38, although normally the chamber 6 will already be substantially filled with liquid at such a time. A restrictive means such as aperture or restrictive orifice 39 or other suitable communicating means interconnects the bottom of the chamber 6 with the liquid trap 28. The chamber 6 is entirely enclosed except for the restrictive orifice 39 and vent 38. The function of the restrictive orifice 39 is to limit flow of the liquid contained in the chamber 6 therefrom during the relatively short period of time associated with the end of the flushing of the liquid from the tank 3, during which time suction is created by the final remnants of liquid passing through the siphon. The orifice 39 must be sufficiently small to allow only a small amount of the liquid contained in the chamber 6 to be drawn therefrom by the siphon action. Yet the orifice 39 must be large enough to allow liquid in the chamber 6 to gravity flow therefrom before substantial filling of the tank 3 occurs and also large enough to prevent blockage by debris and slime in the liquid. Preferably the restrictive orifice 39 is slightly on the downstream side of the liquid trap 28. Particularly effective diameters of the orifice 39 are in the nature of between $\frac{1}{4}$ and $\frac{1}{2}$ inch, although this may vary depending on the size of the siphon 4. Also in construction a large aperture or cutout 40 is made in the siphon back 35 suitable for extending the leg 26 therethrough. A suitably designed discharge chute 22 is attached to the rear of the siphon 4. The channel through the chute 22 defines the lower and rearward portion of the outlet leg 26.

The outlet leg 26 terminates in the ninety degree bend 32 and outlet 19. It is also foreseen that other outlet configurations, such as multiple opening outlets, unequal opening size on multiple outlets, unequal length on discharge legs, and variable length on discharge chutes (not shown) could be used. Liquid exits the outlet 19, when the siphon 4 is discharging such, under force in a flow pattern substantially parallel to the surface 2. The outlet 19 must be positioned lower than the inlet 18 in order to produce driving head for the siphon 4. As used herein the terms "head" or "driving head" when used with regard to the siphon 4 refer to the relative height separation between the water elevation in the tank 3, which as a minimum is the inlet 18 elevation, and the outlet 19. The present embodiment functions well under a wide range of heads, in particular from extremely low minimum heads in the nature of 2 feet to substantially any greater head. The present embodiment has been used with heads as small as 6 inches.

Where a plurality of siphons 4 are to be used simultaneously, such as shown in FIG. 3, the main liquid traps 28 thereof are interconnected by a first equalization conduit 42. Each air trap 29 is interconnected by a second equalization conduit 43. The conduits 42 and 43 are sufficiently large to ensure substantially equal conditions within the traps 28 and 29 respectively of the various siphons 4. Normally where plural siphons 4 are used, only one of the siphons 4, such as the far right siphon in FIG. 3, has a trigger mechanism 5 associated therewith; this trigger mechanism associated siphon 4 is referred to as a master and the remaining siphons 4' are referred to as slaves.

The trigger mechanism 5 of the embodiment shown in FIGS. 1, 2, 3 and 4 includes a burp tube or U-shaped conduit 45 having a liquid trap 46 in the "U" portion thereof. The downstream part 45d of the conduit 45, that is the part on the right as seen in FIG. 3, includes an outlet 47 at the top of the trap 46 which opens to atmospheric air pressure in this embodiment into the discharge chute 22. The upstream part 45u of the conduit 45 includes a riser 48 which has an upper terminus 49 which opens into an upper level in the air trap 29, preferably on the downstream side thereof. The lower portion of the conduit 45 is secured to the front of the discharge chute 22. The riser 48 penetrates the lower exterior wall of the liquid trap 28 and is secured to the inside of the front wall of the leg 24. A flow conductor such as a weep hole or other suitable flow means having a restriction therein and illustrated as aperture 50, interconnects the flow passageway of the riser 48 and the top of liquid trap 28. Each siphon 4 also includes an overflow device for each water trap 28 which overflow device in the present embodiment varies depending upon the particular siphon associated therewith. In the master siphon 4 the overflow device is defined by the channel extending from the trap 28 through the aperture 50, through the trap 46 and out into the discharge chute 22 through the outlet 47. It is foreseen that the trigger mechanism 5 and the overflow device could be independent devices although they are combined herein. In particular, in the master siphon 4 associated with the burp tube or conduit 45, such as the one on the far right in FIG. 3, the weep hole 50, in conjunction with the lower part of the conduit 45 allows the excess liquid from the liquid trap 28 to overflow into the liquid trap 46 from which excess liquid overflows into the discharge chute 22. In the slave siphons 4' not directly equipped with the conduit 45, such as is the one on the left in FIG. 3, the equalization conduit 42 functions as part of the overflow device by allowing excess liquid from the liquid trap 28 of the slave siphon 4' to overflow into the liquid trap 28 of the master siphon 4 after which overflow functions as before described for the master siphon 4.

The flow device 50 must be strategically positioned, such that it is high enough to ensure proper filling of the liquid trap 28, yet low enough to not overfill same thereby creating a "waterlogged state" of the siphon 4, wherein liquid flows through the siphon 4 at the same rate that liquid flows into the tank 3 and, thus, no flushing or siphon action is initiated. In addition the level must not be so low as to place the flow device 50 under a liquid level in leg 24 during filling of the tank; that is, after the liquid trap 28 has been filled and the liquid 13 level in the tank 3 begins to rise and until liquid begins to flow through the siphon 4, the aperture 50 should communicate with the air in the trap 29 only.

The aperture 50 must be substantially restrictive to flow therethrough. The restrictive flow requirement is necessitated because, as will be discussed in greater detail later, the liquid in the trap 46 is substantially blown therefrom when the trigger mechanism 5 initiates flow through the siphon 4, that is puts the siphon 4 in a discharge or flush mode. The trap 46 must for a short time remain substantially free of liquid while air from the trap 29 is flowing therethrough or the siphon action may not be initiated properly which effectively waterlogs the siphon 4. If the aperture 50 is not a restriction to liquid, then liquid entering the leg 24 just prior to start of the siphon action, as will be discussed later, will flow through the aperture 50 into the trap 46 blocking air flow through same and thus disrupting the siphon action.

The levels or heights of columns of liquid and differential height between various columns of liquids are important to the understanding and operation of the present siphon apparatus 1. In particular, referring to FIG. 2, the height of the liquid 13 in the tank 3 is designated $H_1$. If the apparatus 1 has been previously used, $H_1$ should never fall below the level of the inlet 18 (see FIG. 3). The maximum liquid level of the tank 3 is designated $D_1$. The height of the liquid column in the inlet leg 23 is designated $H_2$. The maximum height of the column of liquid in the inlet leg 23 before liquid spills over into the leg 24 is designated $D_2$ and $D_2$ happens to be equal to $H_2$ at the particular stage in the discharge cycle shown in FIG. 2. The differential height between the liquid columns in the inlet leg 23 and the tank 3 is designated $H_3$, and the maximum of this differential is designated $D_3$. The differential height between liquid columns in the upstream and downstream (the greater) portion of the "U" portion, that is trap 46, of the conduit or burp tube 45 is designated as $H_4$, and the maximum differential thereof is designated $D_4$. The differential height between the liquid columns in the leg 24 and leg 25 (or chamber 6 assuming equilibrium therebetween) is designated $H_5$, and the maximum differential thereof is designated $D_5$.

Although the various heights or levels discussed above have no real weight and thus do not exert any pressure, they are proportioned to the actual pressure exerted by the liquid in the various columns and thus will be used herein to discuss the various pressure relationships.

During filling of the tank a state of quasi-equilibrium is maintained until a predetermined level of liquid 13 in the tank 3 ($D_1$) is achieved at which time the trigger mechanism 5 primes the siphons 4 and initiates a siphon action therethrough. During the state of equilibrium, $H_1$ must be substantially equal to the sum of $H_2$ and $H_5$, because the air in the air trap 29 communicates any pressurization thereof to the top of the liquid column in the leg 24; thus, if there is sufficient liquid in the trap 28 to keep air from bypassing the trap 28, then the air pushes the liquid column in leg 24 down and the liquid column in leg 25 up. The differential pressure created by the differential column $H_3$ must be equal to the air pressure in the air top 29 and to $H_5$, since $H_3$ is the difference between $H_1$ and $H_2$ and is thus the driving hydraulic force which pressurizes the air in the air trap 29. In addition, since the air pressure in the air trap 29 communicates through the riser upper terminus 49 and aperture 50 with the conduit 45, $H_4$ receives the same pressure and must equal $H_5$ which in turn equals $H_3$. $D_5$ is greater than $D_4$ and will never be achieved by $H_5$ while the tank 3 is filling, since the siphon action will be initiated, as will be discussed later, when $H_4$ reaches $D_4$.

In operation the siphon apparatus 1 functions to flush the debris from surfaces such as floors of livestock pens 2 by discharge of large amounts of liquid 13 from a tank 3 in a relatively short period of time. (Exceptionally useful discharge rates of each siphon 4 may, for example, be in the nature of 400 to 1200 gallons per minute). The total amount of liquid discharged and rate of discharge are dependent on size and head of the apparatus used. The present embodiment comprises a very efficient siphon which will operate under relatively small heads and over a wide time range of discharge frequencies without significant upsets to the system.

At the end of a discharge cycle, that is, when liquid has just ceased passing through the siphon 4, the tank 3 liquid level will be approximately the height of the siphon inlet 18. The siphons 4 will have just completed discharging the majority of the liquid 13 from the tank 3, and the chamber 6 will be substantially full of liquid (the chamber 6 should hold somewhat more liquid than will be required to insure proper liquid levels in the traps 28 and 46). At this time the level of the tank 3 begins to rise due to liquid flow from the conduit 14, and the liquid in the chamber 6 begins to pass through the aperture 39 into the liquid trap 28, overflowing same through the aperture 50 into the burp tube 45, and most importantly filling the liquid trap 46 of the burp tube 45, and overflowing same into the discharge chute 22 through the outlet 47. The traps 28 and 46 fill before substantial filling of the tank 3 occurs. As the tank 3 liquid level $H_1$ rises, liquid also rises in the inlet leg 23 ($H_2$). As soon as the level $H_2$ is above the height of the aperture 31, the air in the air trap 29 begins to pressurize somewhat and push against the liquid column in leg 24. As this occurs the differential height $H_5$ occurs between the liquid columns on each side of the liquid trap 28. This same air pressure is communicated to the liquid trap 46 thus causing the differential height $H_4$ to occur between the two liquid legs contained therein. Within a short time, as the tank 3 liquid level $H_1$ rises, the pressure in the air trap 29 has exerted sufficient pressure to push the liquid column on the upstream side, that is leg 24 side, of the liquid trap 28 down to the lowest point 53 on the upper part of the liquid trap 28. At this time air bubbles pass through the liquid trap 28 from the leg 24 into the leg 25. This air passage continues until $H_2$ equals $D_2$, at which time small quantities of liquid begin to overflow the inlet leg 23 through air trap 29 into the leg 24. This influx of liquid into leg 24 is deposited in the trap 28 consequently increasing the amount of liquid therein, raising the liquid level primarily in the legs 25 and to a lesser extent in leg 24. The rise of leg 24 is constrained by the compression of air in the leg 24. This rise also effectively raises the level of liquid in the liquid trap 28, thereby stopping the flow of air through the liquid trap 28. Once $H_2$ has equaled $D_2$, then as the tank 3 liquid level $H_1$ continues to rise, $H_3$ and $H_4$ also continue to rise in equivalent amounts. Air in the air trap 29 compresses somewhat and continues to pressurize. The level of liquid in the chamber 6 is substantially equal to the liquid level in the leg 23 during this time. FIGS. 2 and 3 generally illustrate the position in the discharge cycle being discussed at this time, and, in particular, the position somewhat just prior to when the maximum tank level $D_1$ is achieved.

When $H_1$ equals $D_1$ the tank 3 is ready to be discharged. At this time $H_4$ has become equal to $D_4$; and the column of liquid in the upstream portion of the liquid trap 46 is pushed down to a point 54, such that the air in the air trap 29 passes through the burp tube 45, blowing through the liquid trap 46 and normally pushing or entraining the liquid in the downstream portion of the trap 46 out through the discharge chute 22. Substantially all of the air under pressure within all of the interconnected air traps 29 then exits through the burp tube outlet 47 in a relatively short time. Without air pressure to restrain the liquid column in the inlet leg 23 and with the liquid head $H_3$ urging thereagainst, this columns pours over into the leg 24. This influx of liquid in leg 24 and the loss of pressure creating the differential liquid column $H_5$ disrupts the equilibrium previously existing and sets off the siphon action, that is, liquid starts passing vigorously through the siphon 4. It is noted that $H_5$ never reached $D_5$ prior to initiation of the siphon action, thus the liquid in leg 25 could not spill over the top thereof. Such an overspilling of leg 25, if possible, would not set off the siphon flushing action and would effectively waterlog the siphon 4. Since each slave siphon 4' is interconnected at the liquid trap 28 and air trap 29 with the master siphon 4, all are initiated simultaneously by the upsetting of the master siphon 4 associated with the trigger mechanism 5.

The siphon 4 is relatively efficient, producing a relatively high volume outflux per unit time of liquid through the relatively small cross-sectional area of the outlet 19, thus imparting a relatively high velocity to the exiting liquid stream which is then effective in flushing the surface 2. The tank 3 liquid level $H_1$ will normally be drawn down to the level of the inlet 18. The aperture 31 functions to break any vacuum existing in the siphon 4 at the end of discharge. The restrictive means, such as restrictive orifice 39, prevents the siphon action from emptying the chamber 6 and carrying the liquid therein out with the discharged liquid. (With proper sizing of the orifice 39, as little as 1 to 3% of the liquid of the chamber 6 may be lost as the last of the liquid from the tank 3 exits the siphon creating a suction therein.)

At the end of the liquid discharge, the cycle restarts. It is noted that the combination of and cooperation between the liquid holding chamber 6, the overflow device and the burp tube (both 45) allow for substantially equivalent starting conditions within each siphon 4 on each cycle, whether there is too little or too much liquid left in the liquid trap 28 after the liquid discharge is complete. Thus a particular head is not required to adjust the amount of liquid left within the trap 28.

It is noted that $D_1$, that is the maximum liquid level in the tank 3, can be varied somewhat by either lowering the liquid trap 46 relative to the outlet 47 or by raising the outlet 47 relative to the liquid trap 46, thus increasing $D_4$ in either case. Again care must be taken to prevent $D_4$ from exceeding $D_5$. It is possible, although not preferred, that outlet 47 could even be positioned higher than aperture 50 (assuming the liquid trap 46 is properly positioned relative thereto); however, the overfill level in the liquid trap 28 would then be determined by the height of the outlet 47.

The illustrated siphons 4 and 4' are especially efficient because head losses, that is reductions in the energy associated with the liquid as it traverses the flow pathway 17, are increased and concentrated toward the downstream portion of the flow pathway 17. In particular, flow is constricted throughout the flow pathway by reducing the cross-sectional area in successive downstream legs and bends. The radius and cross-sectional areas of bends is reduced toward the outlet. In this embodiment, the outlet 19 is both constricted and the direction of fluid flow through the discharge chute 22 is abruptly changed at the outlet 19.

Figure 5:
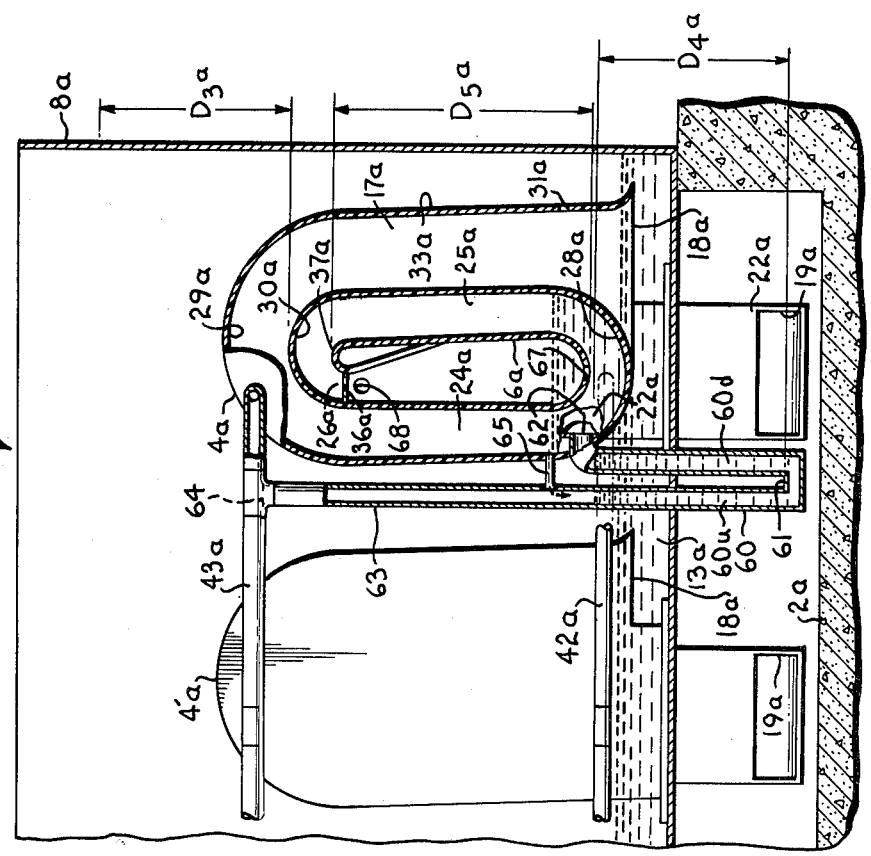
FIG. 5 is a fragmentary front elevational view of an alternative embodiment of the present invention showing a siphon for discharging a tank including a liquid holding chamber and having sections broken away to show details thereof.

Illustrated in FIGS. 5 and 6 is an alternative embodiment of the present invention wherein each of the parts which are the same as in the previous embodiment and have basically the same function are given the same numeral with the suffix "a".

In the alternative embodiment the combination overflow device and trigger mechanism 60 comprises: a flow conducting loop or liquid trap 61 which discharges on the downstream (the portion to the right in FIG. 5) side $60d$ of the trap 60 into the discharge chute $22a$ at outlet 62; and a riser 63 on the upstream side $60u$ of the trap 60 which opens into the air equilibrium conduit $43a$ at outlet 64. A small flow restrictive conduit 65 interconnects the riser 63 and leg 24a and functions similar to the aperture 50 in the previous embodiment.

The flow restrictive orifice 67 and upper vent 68 associated with the chamber 6a have slightly displaced positions compared to their counterparts, orifice 39 and vent 38, of the previous embodiment but also function the same.

Although construction in this embodiment is somewhat different than the previous embodiment, the siphon apparatus 1a functions essentially the same. FIGS. 5 and 6 illustrate that stage in the discharge cycle which occurs soon after discharge of liquid 13 from the tank 3 is complete. In this particular stage of the cycle, the liquid in the chamber 6a has had sufficient time to flow through the orifice 67, to fill the traps 28a and 61 and to overflow excess liquid into the discharge chute 22a.

Although specific embodiments have been disclosed herein, the present invention is understood not to be limited thereto. In particular, it is foreseen that the siphon liquid trap filling chamber and restrictive means could be utilized in any siphon requiring a liquid trap. Also the trigger mechanism and overflow mechanisms can be independent. Each siphon could include additional liquid and air traps. The overflow devices shown could be varied significantly and, in particular, each siphon could have an overflow conduit, such as conduit 65 in FIG. 5, connecting the top of the liquid trap thereof with a suitable overflow channel, such as the burp tube 60 of FIG. 5. And various mechanical devices could be substituted for equivalent parts of the siphon apparatus, although such is not preferred since mechanical or moving mechanisms are subject to failure and require greater manual attention.

Having thus described the invention, what is claimed and desired to secure by Letters Patent is:

1. In a liquid siphon for discharging liquid from a tank at the end of a discharge cycle; said siphon having a flow pathway comprising a plurality of legs and a plurality of bends interconnecting said legs; one of said bends comprising a first liquid trap having a predetermined maximum fill level associated with the tank being substantially empty and one of said bends comprising an air trap; said air trap being positioned upstream of said first liquid trap; said siphon also including filling means to fill said first liquid trap after discharging said liquid from said tank and before a subsequent filling of the tank; the improvement comprising a device for eliminating liquid received from said filling means in excess of the amount required to achieve the maximum fill level in said first liquid trap associated with the tank being substantially empty and for triggering the discharge of the liquid from said tank when the liquid therein reaches a predetermined level; said device comprising:
(a) a second liquid trap having an outlet at a downstream end thereof and an inlet at an upstream end thereof; said outlet having a level being not elevated above the maximum fill level of said first trap associated with the tank being full; and
(b) flow means connecting said inlet of said second liquid trap and said first liquid trap and cooperating with said filling means, such that when said first liquid trap is filled greater than said maximum fill level associated with the tank being substantially empty by said filling means, then excess liquid in said first liquid trap flows through said flow means to said second liquid trap and such that when no excess liquid is in said first liquid trap, then said flow means communicates with said air trap.

2. The siphon according to claim 1 wherein:
(a) said flow means includes a restrictive means therein; said restrictive means substantially restricting liquid flow through said flow means as compared to liquid flow through said second liquid trap.

3. The siphon according to claim 2 including:
(a) conduit means; said conduit means communicating with said inlet of said second liquid trap and with a top portion of said air trap at a second level substantially above said first trap maximum fill level; whereby liquid in said siphon cannot flow into said second trap, except through said flow means, until said siphon has filled sufficiently to produce a liquid level therein above said second level.

4. The siphon according to claims 1, 2 or 3 wherein:
(a) said first and second liquid traps each have upstream and downstream sides with associated differential liquid columns between the upstream and downstream sides thereof; the differential liquids columns result from air pressure from said air trap communicating directly with the upstream side of both said first and second liquid traps; the differential liquid columns of said first and second traps each have a maximum height associated therewith and the latter maximum height is always less than the former; such that the maximum differential height of the liquid columns associated with said second trap is always reached first; whereupon air from said air trap blows through said second liquid trap, thereby releasing the air pressure in said air trap and initiating vigorous siphon action through said siphon.

5. The siphon according to claim 4 wherein:
(a) said siphon includes an inlet and an outlet;
(b) said flow pathway of said siphon is arranged in a spiral shape with said siphon inlet and outlet being on the inside and outside respectively of said spiral shape.

6. The siphon according to claim 4 wherein:
(a) said siphon is a master siphon; and including at least one slave siphon; said slave siphon having substantially an identical flow pathway as said master siphon at corresponding levels and including a liquid trap and an air trap;
(b) first communicating means interconnecting the air trap of said slave siphon and the air trap of said master siphon whereby substantially equivalent air pressure is maintained in each said air trap; and
(c) second communicating means interconnecting the first liquid trap of said master siphon and the liquid trap of said slave siphon, whereby excess liquid above a maximum fill level in said slave siphon liquid trap overflows therefrom into the first liquid trap of said master siphon and whereby liquid levels within the first liquid trap of said master siphon and the liquid trap of said slave siphon are substantially equivalent, while said tank is filling with liquid; such that said master siphon and said slave siphon initiate siphon action simultaneously when air blows through the second liquid trap of said master siphon.

* * * * *

UNITED STATES PATENT AND TRADEMARK OFFICE
CERTIFICATE OF CORRECTION

PATENT NO. : 4,319,601
DATED : March 16, 1982
INVENTOR(S) : John A. George

It is certified that error appears in the above—identified patent and that said Letters Patent is hereby corrected as shown below:

After "Appl. No.:" delete "43,962" and insert --43,692--.

Signed and Sealed this

Eighth Day of June 1982

|SEAL|

Attest:

GERALD J. MOSSINGHOFF

Attesting Officer

Commissioner of Patents and Trademarks